US012663184B2

(12) United States Patent　　　　(10) Patent No.:　US 12,663,184 B2

Barksdale　　　　　　　　　　　　(45) Date of Patent:　　Jun. 23, 2026

(54) SOLAR POOL HEATER

(71) Applicant: Kenneth Barksdale, Sykesville, MD (US)

(72) Inventor: Kenneth Barksdale, Sykesville, MD (US)

( * ) Notice: Subject to any disclaimer, the term of this patent is extended or adjusted under 35 U.S.C. 154(b) by 410 days.

(21) Appl. No.: 18/374,241

(22) Filed: Sep. 28, 2023

(65) Prior Publication Data

US 2024/0102697 A1　　Mar. 28, 2024

Related U.S. Application Data

(60) Provisional application No. 63/410,702, filed on Sep. 28, 2022.

(51) Int. Cl.
　　F24S 10/17　　　　(2018.01)
　　F24S 20/00　　　　(2018.01)
(52) U.S. Cl.
　　CPC .............. F24S 10/17 (2018.05); F24S 20/02 (2018.05)
(58) Field of Classification Search
　　CPC .................................. F24S 10/17; F24S 20/02
　　USPC .................................................. 126/561–568
　　See application file for complete search history.

(56) References Cited

U.S. PATENT DOCUMENTS

| | | | | |
|---|---|---|---|---|
| 4,380,993 A | * | 4/1983 | Spitzer | F24S 10/10 |
| | | | | 126/567 |
| 4,756,300 A | * | 7/1988 | Ewers | F24S 10/17 |
| | | | | 126/567 |
| 7,891,351 B2 | * | 2/2011 | Hinderling | F24S 40/00 |
| | | | | 126/576 |
| 2012/0024372 A1 | * | 2/2012 | Delgado | H02S 40/44 |
| | | | | 126/646 |

OTHER PUBLICATIONS

Shinjopump.com. "Diaphragm Pump Usages and Applications." Pump Manufacturer, Aug. 22, 2021, www.shinjopump.com/news/diaphragm-pump-usages-and-applications.html. (hereinafter, Shinjo).*

* cited by examiner

*Primary Examiner* — Vivek K Shirsat
(74) *Attorney, Agent, or Firm* — Royal Craig LLC; Royal W. Craig

(57) ABSTRACT

An automated wirelessly-controlled solar pool heater including a photothermal module atop a floatation vessel for exposure to the sun, an internal pump assembly, a first temperature sensor for sensing temperature in the photothermal module, a second temperature sensor for sensing ambient pool water, a microcontroller board with wireless transceiver for remote monitoring and operation, and a solar-charging battery. In operation, the pump assembly self-primes and automatically fills the entire photothermal module with pool water. Water in the photothermal module begins to heat via heat absorption from the sun's rays and, when heated, the microcontroller activates the pump assembly to intermittently expel a partial volume of the heated water back into the pool, simultaneously refilling the photothermal module with unheated pool water. The recirculation program continues until the water temperature of the entire pool reaches its desired temperature.

13 Claims, 5 Drawing Sheets

SOLAR POOL HEATER

CROSS-REFERENCE TO RELATED APPLICATION(S)

The present application derives priority from U.S. Provisional Patent Application 63/410,702 filed 28 Sep. 2022.

BACKGROUND OF THE INVENTION

1. Field of the Invention

The present invention relates generally to pool heaters and, in particular, a floating solar pool heater that employs a passive photothermal module for solar heat absorption and a wireless-enabled processor for remote pool temperature control.

2. Description of the Background

Water heaters are often used in pools to maintain a comfortable water temperature. There are a variety of different types of pool water heaters. For example, flexible covers made of heat-absorbing materials are used to raise the temperature of the pool water. Unfortunately, pool covers restrict access to the water, are unwieldy and cumbersome to remove and replace, difficult to store, and often sink below the surface of the water.

Electrically-operated heaters are effective in some circumstances, but are expensive to operate and potentially unsafe if electrical contacts are exposed to the water.

Gas-operated heaters are also effective in some circumstances, but are likewise expensive to operate and potentially unsafe if the gas leaks.

Solar pool heaters are well-known and solve the foregoing problems. Solar heaters typically feed water to stationary solar panels installed nearby. The pool water may be pumped to the solar panels via electric pumps. However, most conventional solar pool heaters are very expensive, large and aesthetically unpleasant, and require substantial effort to install. They are also fairly inefficient due to heat loss in the return lines.

Consequently, there remains a need for a low cost modular high efficiency solar pool heater that can alleviate the disadvantages of the existing solar pool heating systems.

What is needed is a compact and efficient fully-automated and yet remotely controlled solar pool heater.

SUMMARY OF THE INVENTION

According to an embodiment of the invention, an automated wirelessly-controlled solar pool heater is disclosed that includes a photothermal module arrayed on a floatation vessel for good exposure to the sun, a pump assembly for intermittently pumping water through the photothermal module, one or more temperature sensors for sensing temperature in the photothermal module. The water is pumped by a pump assembly powered by a battery bank that is charged by a solar panel. The pool heater is controlled by a microcontroller board with wireless transceiver for remote monitoring and programmed operation. In operation, the pump assembly self-primes and automatically fills the entire photothermal module with pool water. Water in the photothermal module begins to heat via heat absorption from the sun's rays. Initially it takes 9-10 minutes for the water in photothermal module to reach a maximum temperature, at which point the microcontroller board activates the pump assembly to intermittently expel a partial volume of the heated water residing therein back into the pool, simultaneously refilling the photothermal module with unheated pool water. The recirculation program continues until the water temperature of the entire pool reaches its desired temperature.

The present invention is described in greater detail in the detailed description of the invention, and the appended drawings. Additional features and advantages of the invention will be set forth in the description that follows, will be apparent from the description, or may be learned by using the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

Figure 1:
FIG. 1 is a perspective view of a solar pool heater 2 according to an embodiment of the invention.

As seen in FIG. 1, the present invention is an automated wirelessly-controlled solar pool heater 2 comprising a floatation vessel 10, a passive water-heating photothermal module 20 arrayed in a circuitous pattern for good surface area exposure to the sun, and an internal computer-controlled solar-powered pump assembly (to be described) for periodically inducting pool water into the photothermal module 20 for heating and expelling heated water from photothermal module 20 back into the pool.

Figures 2, 3, 4:
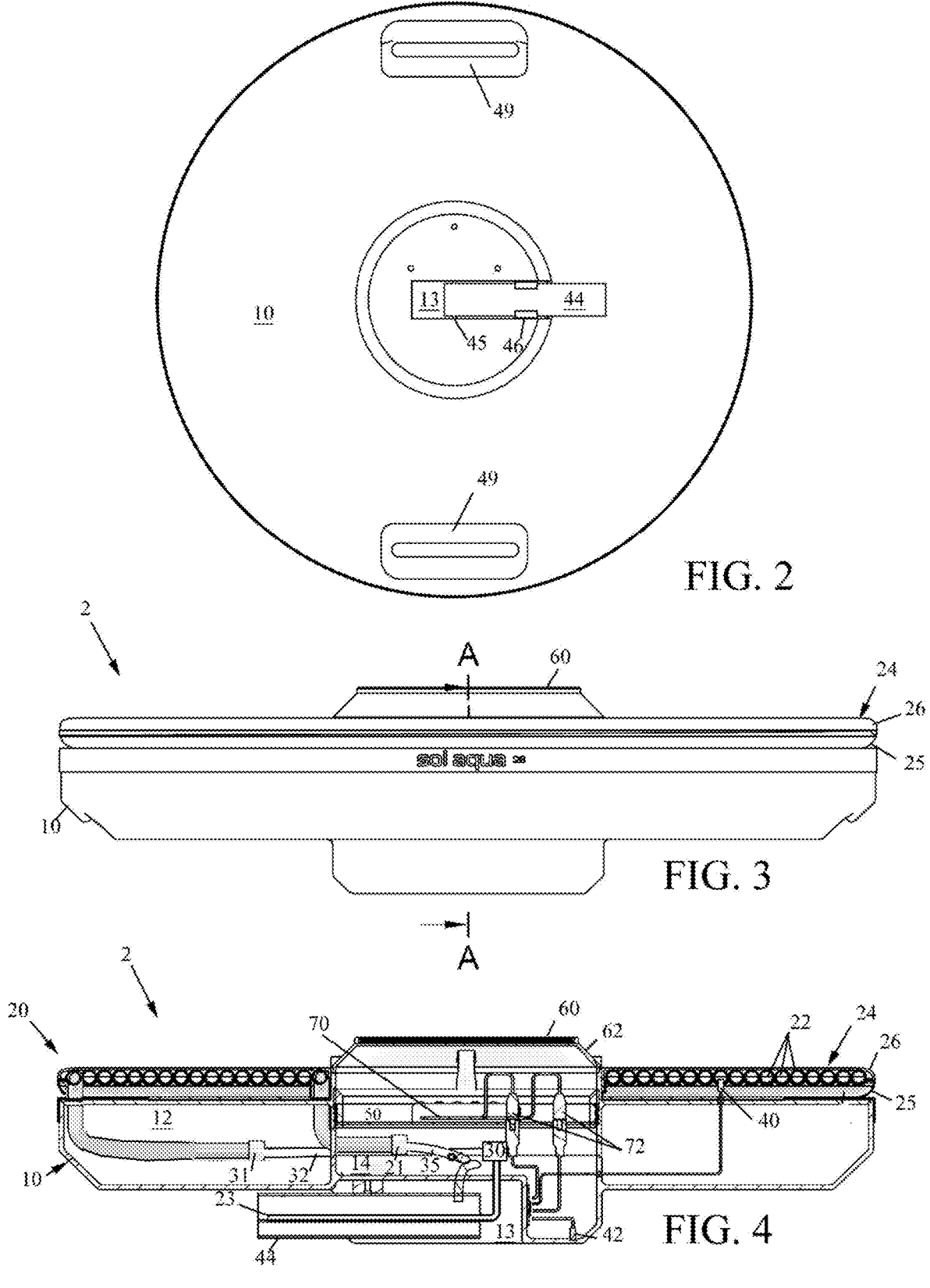
FIG. 2 is a bottom view of the solar pool heater 2 of FIG. 1.
FIG. 3 is a side view of the solar pool heater 2 of FIGS. 1-2.
FIG. 4 is a side cross-section taken along the line A-A of FIG. 3.

FIG. 2 is a bottom view of the solar pool heater 2, FIG. 3 is a side view, and FIG. 4 is a side cross-section taken along the line A-A of FIG. 3. With combined reference to FIGS. 2-4 the floatation vessel 10 comprises a disc-shaped housing with enclosed buoyancy ring 12 surrounding a central chamber 14 that is subdivided into separate waterproof compartments for the pump assembly 30 and microcontroller board 70, plus a downwardly-protruding compartment 13 with pull-down spout 44 that when deployed protrudes well-beneath the water level for extended water intake and outlet.

The photothermal module 20 is carried atop the floatation vessel 10 for maximum sun absorption. In the illustrated embodiment the photothermal module 20 defines a circuitous interior matrix or array of dark-colored conduits 22 that maximize surface contact with the water therein for maximum photothermal efficiency.

FIG. 2 illustrates the spout 44, which is a square open-ended tubular member formed with hinge pins 45 at one end journalled into the walls of the bay 13. The spout 44 may be seated flush inside bay 13 or deployed to a downwardly extended position protruding 3-6" beneath bay 13. Detent clips 46 may be provided to prevent inadvertent deployment. The water intake tube 23 and discharge tube 35 both enter the spout 44 at the hinged end. FIG. 2 also illustrates two opposing handles 49 molded into the bottom of the floatation vessel 10 to assist in carrying the solar pool heater 2.

With spout 44 extended, the pump 30 intermittently pumps water into the circuitous photothermal module 20 through intake tube 23, where it travels through the circuitous path past one of at least two temperature sensors 40, 42 (one internal sensor 40 for sensing temperature in the photothermal module 20 and one external sensor 42 for the temperature of the pool water). A battery bank 50 is connected to the pump 30, to a solar panel 60 for maintaining battery bank 50 charge, and to a microcontroller board 70 with processor, software and wireless transceiver for remote monitoring and programmed operation of solar pool heater 2 as will be described. In operation, when first placed in the pool the pump assembly 30 is self-priming and automatically fills the entire photothermal module 20. Once full, the pump assembly 30 stops and the water in the photothermal module 20 begins to heat via heat transfer from the black photothermal module absorbing the sun's rays. The darkly-colored (e.g., black) circuitous interior conduits 22 of photothermal module 20 absorb the sun's heat and transfer it to the water contained inside by direct photothermal contact. Initially it takes 9-10 minutes for the water in photothermal module 20 to reach a maximum temperature (e.g., 115 degrees). Microcontroller board 70 monitors the internal temperature via internal temperature sensor 40, which is imbedded inside the photothermal module 20, optimally at or near the circuitous midpoint. Once the temperature of the water in the photothermal module 20 is heated to a preset temperature apex, microcontroller board 70 activates the pump assembly 30 to expel a volume of the heated water residing in photothermal module 20 (e.g., half the water) back into the pool, simultaneously refilling half the photothermal module 20 with unheated pool water. Water remaining in the photothermal module 20 mixes with the incoming pool water and heats it, allowing the temperature of the preset water in the photothermal module 20 to reach its apex more quickly. The recirculation program continues: each time the water in the photothermal module 20 reaches the preset apex the pump assembly 30 will again flush a partial volume of the water, and the cycle continues. Microcontroller board 70 monitors the external temperature via external temperature sensor 42, which is outwardly exposed/embedded in the wall of the floatation vessel 10, and microcontroller board 70 continues to periodically recirculate half the water in photothermal module 20 until the water temperature of the pool water as measured at external sensor 42 reaches its desired temperature. The microcontroller board 70 is wirelessly enabled and remotely-programmable by a software application resident on a laptop, smart phone or the like. In the illustrated embodiment the photothermal module 20 comprises a disc-shaped two-part housing 24 that is affixed atop buoyancy ring 12 likewise surrounding central chamber 14, e.g., concentric circular discs, for example, of 28" diameter. Housing 24 may comprise a black matte bottom section 25 and top section 26 that absorbs light energy from sunlight allowing it to heat water contained therein. The bottom section 25 and top section 26 of housing 24 preferably snap-fit together to define a tubiform helical interior passage, or other circuitous interior matrix or array of dark-colored conduits 22. One skilled in the art should understand that the bottom section 25 of photothermal module 20 may be co-molded with floatation vessel 10, and that conduits 22 need not be molded but may alternatively comprises a separate coiled-hose fitted into a two-part housing 24. Although the illustrated photothermal module 20 is arrayed in a spiral pattern, one skilled in the art should understand that photothermal module 20 may be continuously-arrayed in most any internal geometric pattern, e.g., square, hexagon, etc., affixed atop a conforming floatation vessel 10. Photothermal module 20 leaves room at the center for the central chamber 14 of floatation vessel 10, which again is preferably subdivided into separate water-proof housings for the bay 13, pump assembly 30, battery bank 50, and microcontroller board 70. The pump assembly 30 includes a pump, preferably a 12V solar water pump such as, for example, a Kamoer™ KLP02 micro diaphragm pump with 12V DC brushless motor and 700 ml/min flow rate. The output of pump 30 is preferably connected via port 31 to one end of the internal conduit of photothermal module 20 by a clear intake tube 32 for easy viewing. Similarly, the other end of the internal conduit of photothermal module 20 is connected via discharge port 21 through a clear tube 35. Both tubes 32, 35 continue into spout 44, which extends water intake/discharge below the floating waterline of floatation vessel 10.

Figure 5:
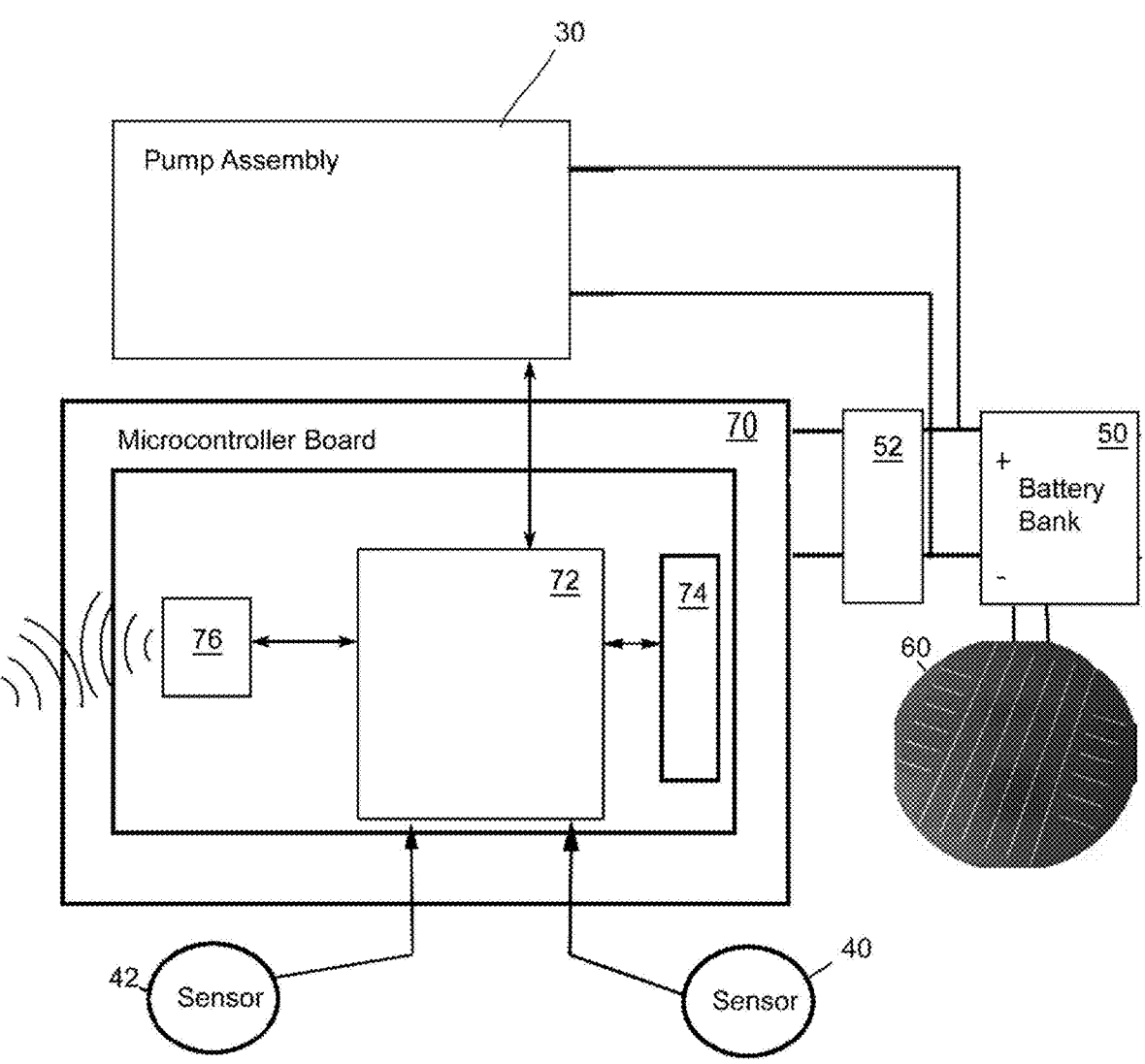
FIG. 5 is a block diagram of the pump assembly 30, temperature sensors 40, 42, battery bank 50, solar cell 60 and microcontroller board 70.

The solar panel 60 is a small circular 7" panel adhered atop a conical riser 62 that fits atop the central chamber 14 of floating housing 10, preferably using a quarter-turn twist-lock engagement to provide easy access to the battery 50. The solar panel 60 is calibrated to charge the battery bank 50, hence the solar panel 60 may output 700 mA at 12V to charge a battery bank 50 comprising a 12V 8 Ah NiMH Rechargeable Battery. The battery bank 50 provides power to the pump 30 through a first fuse block 72 and to microcontroller board 70 via a second fuse block 72. FIG. 5 is a block diagram of the pump assembly 30, temperature sensor 40, temperature sensor 42, battery bank 50, solar cell 60 and microcontroller board 70. The microcontroller board 70 includes a processor 72, on board non-transitory memory 74, and an on-board wireless transceiver 76 for remote communication. Processor 72 is in communication with temperature sensors 40, 42. As indicated above the temperature sensor 40 is imbedded inside the photothermal module 20 at or near the midpoint to provide a temperature measurement of the water inside the photothermal module 20 to processor 72. In contrast, temperature sensor 42 is preferably embedded in the bottom wall of bay 13. This way, processor 72 can also monitor the temperature of the pool water. Processor board 70 may be any suitable low-power computer processor platform with on-board memory 74 and wireless communication capability by, for example, LAN and/or Bluetooth® connectivity via transceiver 76. A software application is stored in memory 74 for execution by processor 72.

Figures 6, 7:
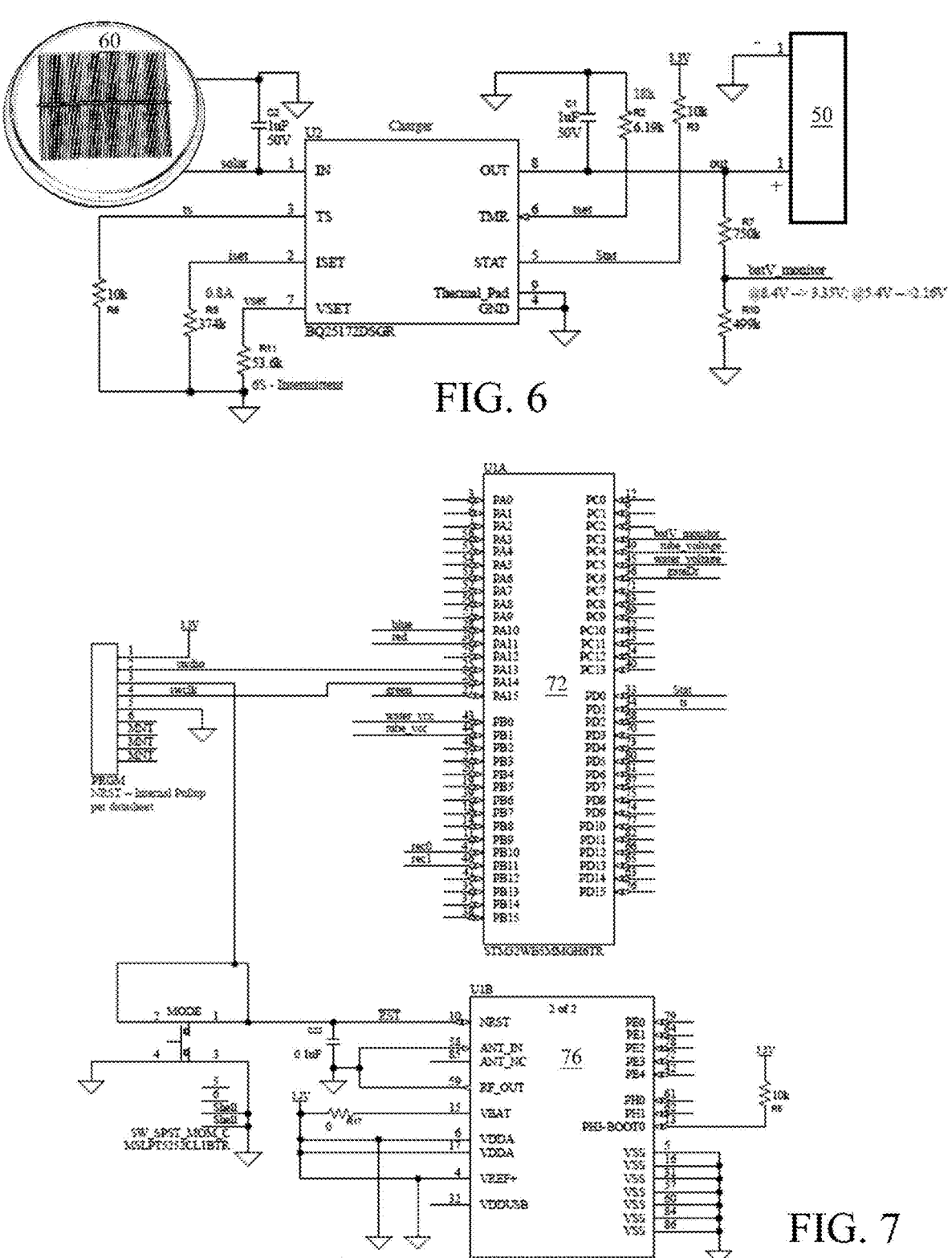
FIG. 6 is a schematic diagram of an exemplary solar charging module for maintaining battery bank 50 via solar panel 60.
FIG. 7 is a schematic diagram of an exemplary microcontroller board 70.

FIG. 6 is a schematic diagram of an exemplary solar charging module for maintaining battery bank 50 via solar panel 60, which is based on a Texas Instrument™ BQ25172 integrated 800-mA linear charger for 1-cell to 6-cell NiMH batteries.

FIG. 7 is a schematic diagram of an exemplary micro-controller board 70 which is based on an ST™ STM32WB5MMG wireless microcontroller incorporating an Arm® Cortex®-M4 processor core 72 running at 64 MHz (application processor) and an Arm Cortex-M0+ wireless core 76 (wireless front end), with onboard 1 Mbyte Flash memory 74 and capable of wireless Bluetooth LE 5.4 and 802.15.4 protocols.

The internal temperature sensor 40 and external temperature sensor 42 may be any suitable temperature sensors capable of accurately sensing a range of from 55° C.~130° C., such as Texas Instruments™ LM19CIZ/LFT4.

Figure 8:
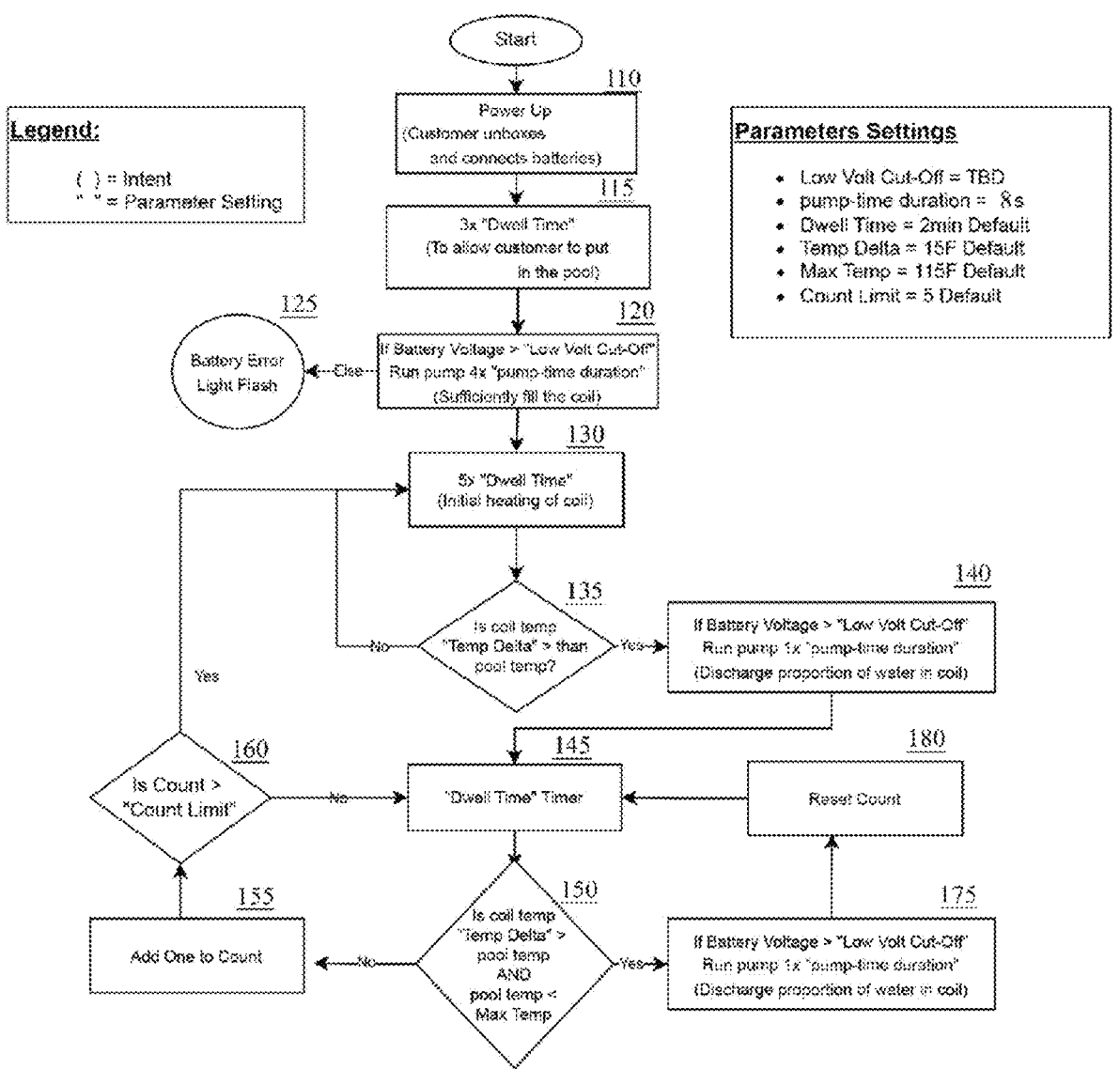
FIG. 8 is a flow diagram of the resident software application stored in microcontroller board 70 memory.

FIG. 8 is a flow diagram of the resident software application stored in memory 74.

At step 110 the solar pool heater 2 is powered up and the software instantiates. The software requires several programmed parameter settings all of which initiate to default settings but may be user-customized by wireless transmission from a remote application running on a user's smartphone or other remote device.

| Parameter | Description | Default |
|---|---|---|
| Low Volt Cut-Off | Min. Battery Charge | 9 v |
| Pump-time Duration | A Pump Cycle | 8 sec |
| Dwell Time | A delay | 2 min |
| Temp Delta | Photothermal Water Temp | 15 F. |
| Max Temp | Desired Pool Temp | 115 F. |
| Count Limit | | 5 sec |

At step 115 the processor 72 waits three times the Dwell Time to allow the user to place the solar pool heater 2 in their pool.

At step 120 the processor 72 measures and compares the battery bank 50 voltage to the Low Volt Cut-Off to ensure that the battery bank 50 has an operational charge. If not, at step 125 a battery error LED flashes. If the battery bank 50 voltage is greater than the Low Volt Cut-Off, then processor 72 activates the pump assembly 30 for a multiple of Pump-time Durations sufficient to prime and automatically fill the entire photothermal module 20, e.g., four times a Pump-time Duration equals 32 seconds.

At step 130, the processor 72 then waits a predetermined delay period, some multiple of the Dwell Time (e.g., five times the Dwell Time or 10 minutes) for the water in photothermal module 20 to warm fully. The initial delay period is calibrated to ensure that the water in photothermal module 20 reaches its apex temperature, typically resulting in a temperature differential of fifteen degrees between the pool water temperature versus the water temperature in the photothermal module 20. Use of an apex temperature differential maximizes the heating advantage of the photothermal module 20 and minimizes the amount of time needed to raise the pool water temperature.

At step 135 the processor 72 measures the apex temperature of the water in photothermal module 20 Ta at sensor 40 and stores the measured apex Ta. Processor 72 the compares the temperature of the water in photothermal module 20 Ta at sensor 40 to the pool water temperature Tp, and so long as Ta>Tp proceeds to step 140.

At step 140 the processor 72 again measures and compares the battery bank 50 voltage to the Low Volt Cut-Off to ensure that the battery bank 50 has an operational charge. If not, flow returns to step 115 to await a full charge. If so, processor 72 activates the pump assembly 30 for a single Pump-time Duration sufficient to refresh one-half the water in photothermal module 20, e.g., one times a Pump-time Duration equals 8 seconds.

Flow proceeds to step 145 and processor 72 then waits a predetermined delay period, e.g., a single Dwell Time (2 minutes) for the new water inducted into photothermal module 20 to warm fully.

Next, at step 150, the processor 72 measures the apex temperature of the water in photothermal module 20 Ta at sensor 40 and stores the measured apex Ta, and the pool water temperature Tp at sensor 42. Processor 72 the compares the temperature of the water in photothermal module 20 Ta at sensor 40 to the pool water temperature Tp, and if Ta>Tp AND the pool water temperature Tp is less than the desired pool temperature Max Temp (115 F), flow proceeds to step 175.

At step 175 processor 72 activates the pump assembly 30 for a single Pump-time Duration sufficient to refresh one-half the water in photothermal module 20, e.g., one times a Pump-time Duration equals 8 seconds.

At step 180 processor 72 resets a cycle count and returns to step 145.

If at step 150 processor 72 compares the temperature of the water in photothermal module 20 Ta at sensor 40 to the pool water temperature Tp, and either Ta<Tp OR the pool water temperature Tp equals or exceeds the desired pool temperature Max Temp (115 F), flow proceeds to step 155.

At step 155 processor 72 increments the cycle count.

At step 160 processor 72 compares the current cycle count to the Count Limit (e.g., 5 sec). If the current cycle count is less than or equal to the Count Limit flow proceeds to step 145. If the current cycle count exceeds the Count Limit flow returns to step 130 above. The recirculation steps 145, 150, 175 and 180 repeat as needed, flushing a partial volume of the water, until the water temperature of the entire pool reaches the desired preset maximum temperature Max Temp.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A solar pool heater, comprising:

a floatation vessel;

a photothermal module arrayed on the floatation vessel for exposure to the sun, said photothermal module further comprising a black spiral fluid conduit seated atop said floatation vessel for direct exposure to the sun, said black spiral fluid conduit having an input and an output;

a pump connected to the black spiral conduit for intermittently pumping water through the photothermal module;

a first temperature sensor for sensing temperature in the photothermal module;

a second temperature sensor for sensing ambient pool water temperature;

a microcontroller in communication with said pump assembly, said first temperature sensor and said second temperature sensor for intermittently activating said pump assembly to intermittently expel heated water from the output of said photothermal module while inducting unheated water into the input of said photothermal module when a temperature differential between the first temperature sensor and the second temperature sensor exceeds a preset threshold.

2. The solar pool heater of claim 1, wherein said pump comprises a diaphragm pump.

3. The solar pool heater of claim 1, wherein said pump is self-priming.

4. The solar pool heater of claim 1, further comprising a wireless transceiver for remote monitoring and programmed operation of said microcontroller.

5. The solar pool heater of claim 1, further comprising a battery bank for powering said pump, and a solar charger for charging said battery bank.

6. A solar pool heater, comprising:

a floatation vessel comprising a buoyant chamber surrounding an enclosed waterproof housing;

a water-heating photothermal module arrayed above the floatation vessel for exposure to the sun, said photothermal module further comprising a black spiral fluid conduit seated atop said floatation vessel for direct exposure to the sun, said black spiral fluid conduit having an input and an output;

a pump assembly connected to the black spiral fluid conduit or said photothermal module for intermittently pumping water through the photothermal module;

a first temperature sensor for sensing temperature in the photothermal module; and a second temperature sensor for sensing temperature of pool water;

a second temperature sensor for sensing ambient pool water temperature;

a microcontroller in communication with said pump assembly, said first temperature sensor and said second temperature sensor for activating said pump assembly to intermittently expel a partial volume of heated water from the output of said photothermal module while inducting an equal volume of unheated water into the input of said photothermal module when a temperature differential between the first temperature sensor and the second temperature sensor exceeds a preset threshold.

7. The solar pool heater of claim 6, wherein said pump assembly comprises a diaphragm pump.

8. The solar pool heater of claim 7, wherein said pump assembly is self-priming.

9. The solar pool heater of claim 6, further comprising a wireless transceiver for remote monitoring and programmed operation of said microcontroller.

10. The solar pool heater of claim 6, further comprising a battery bank for powering said pump and a solar charger for charging said battery bank.

11. A solar pool heater, comprising:

a floatation vessel;

a water-heating photothermal module arrayed above the floatation vessel for exposure to the sun, said water-heating photothermal module further comprising a black spiral fluid conduit seated atop said floatation vessel for direct exposure to the sun, said black spiral fluid conduit having an input and an output;

a pump for intermittently pumping water through the photothermal module; and a first temperature sensor for sensing temperature inside the spiral fluid conduit of said photothermal module;

a second temperature sensor for sensing ambient pool water temperature; and a microcontroller in communication with said pump, said first temperature sensor, and said second temperature sensor for activating said pump to intermittently expel a partial volume of water from the output of the spiral fluid conduit of said photothermal module while inducting an equal partial volume of unheated pool water into the input.

12. The solar pool heater of claim 11, wherein said pump assembly comprises a self-priming diaphragm pump.

13. The solar pool heater of claim 11, further comprising a wireless transceiver for remote monitoring and programmed operation of said microcontroller.

\* \* \* \* \*